United States Patent Office 3,412,039
Patented Nov. 19, 1968

3,412,039
CLAY CATALYST FOR POLYMERIZATION OF
UNSATURATED FATTY ACIDS
Sidney E. Miller, deceased, late of St. Paul, Minn., by
Barbara B. Miller, executrix, St. Paul, Minn., assignor
to General Mills, Inc., a corporation of Delaware
No Drawing. Filed Mar. 13, 1964, Ser. No. 351,831
6 Claims. (Cl. 252—428)

ABSTRACT OF THE DISCLOSURE

This invention relates to polymerization of unsaturated fatty acids wherein the polymerization catalyst is clay which has been stabilized with acetic anhydride and a lithium compound.

This invention relates to the clay catalyzed polymerization of unsaturated fatty acids to provide polymeric fat acids and to novel catalyst compositions for the polymerization thereof and in particular, to the preparation of dimeric and higher polymeric acids from mono- and poly-unsaturated fatty acids by conducting the polymerization in the presence of a lithium and acetic anhydride stabilized clay.

It is, therefore, an object of this invention to provide a process of preparing polymeric fat acids in which the polymerization is conducted in the presence of a clay stabilized with a lithium compound and acetic anhydride.

It is also an object of this invention to provide a process of preparing polymeric fat acids employing a novel catalyst composition.

Dimerization of unsaturated fatty acids in the presence of clay catalysts has long been known (Johnston 2,347,-562). Indications are that in the absence of steam environment, dehydration occurs which unfavorably affects the clay structure. If sufficient dehydration occurs, the action seems to be irreversible. Thus, the clay catalysts tend to deteriorate under polymerization conditions (i.e., 180–260° C.) unless a steam environment is maintained about the clay.

I have now discovered that acetic anhydride along with lithium compounds may be employed to stabilize the clay.

Briefly, the process of polymerization consists of heating the unsaturated fatty acids, an individual fatty acid or mixtures thereof, derived from oils or fats at temperatures in the range of 160 to 260° C. in the presence of the stabilized clay. Higher temperatures up to about 300° C. may be employed if desired; however, there is generally no advantage in employing temperatures in excess of 280° C. The usual temperature range employed is 200 to 240° C., with about 215–230° C. being preferred. The polymerization may be conducted at atmospheric pressure or at elevated conditions of pressure. The pressure generally results from, and is thus dependent on, the volatiles present in the reaction mixture and largely on the water naturally present in the clay. In general the pressures generated will be on the order of 25 to in excess of 250 p.s.i. Particularly at the lower polymerizing temperatures and low clay concentration, however, pressures as low as 4 p.s.i. may be employed.

If the pressures developed are not as high as desired, water may be added to develop the desired pressure. In general it is unnecessary to add water to develop the pressure, particularly at the preferred clay levels employed. The total water present should generally be between about 1–5% by weight based on the fatty acids employed. The most desirable water content lies between 1.5–2.5% with about 2% being preferred. If the polymerization is conducted at atmospheric pressure it is of course conducted in the substantial absence of water in view of the polymerizing temperature employed.

The amount of clay employed is not particularly critical, the general range of clay from an economic standpoint being from about 5 to about 35% based on the weight of fatty acids. About 10–25% is preferred, as this appears to provide optimum properties. While amounts larger than 25% may be employed, such amounts do present some operational problems without appearing to provide any proportional benefits. Amounts below 5%, down to as low as 1%, are generally less economical and require extended heating periods.

The time of treatment will, of course, vary with the temperature used and the amount of clay employed; however, generally the time of treatment in a batch process will vary from as low as 1 hour to as high as 8 hours. At the preferred temperatures of about 215–230° C., about 4 to 6 hours are preferably employed.

After the polymerization step, the product is cooled to about 150° C. and then filtered to separate the clay catalyst. At this stage and prior to filtration, the product may be given various optional treatments in order to improve the color of the product. Since iron compounds are usually present in the clays, their reaction products with fatty acids usually introduce color bodies in the polymerized fatty acids. These may be removed by adding small amounts of phosphoric acid to the warm reaction product prior to filtration. The phosphoric acid treatment also serves to decompose any lithium soaps which may be present. Decolorizing carbons and filter aids may also be added to assist in decolorizing and in filtration of the product.

After filtration, the filter cake is washed with a solvent in order to extract any fatty acid reaction products and the solvent then removed by evaporation or distillation. Such solvents as hexane, heptane or any of the lower boiling hydrocarbon solvents may be used as extracting solvents, or the filter cake may be extracted with hot unpolymerized fatty acids such as those which are obtained as a byproduct from the polymerized fatty acids.

After filtration, the reaction product is stripped of any solvent which may have been used in the filtration process and is then distilled or stripped at low pressures on the order of 0.1 to 3 mm. The monomeric fatty acids are removed at temperatures in the range of up to 250–260° C. at 0.1 to 0.3 mm., leaving a residue of polymerized fatty acids consisting mainly of dimerized fatty acids and polymers plus small amounts of monomeric unpolymerized acids. The composition will vary, depending upon the polymerization conditions, temperatures and pressures, and temperatures used for distilling the reaction product. Normally, the compositions as determined by careful distillation at low pressures, will be about 5 to 10% monomeric fatty acids, 55 to 75% dimeric acids and 15 to 25% higher polymers. The monomer acids recovered in the distillation of the reaction product may be used for extracting the filter cakes obtained in other polymerizations, thereby eliminating the use of hydrocarbon solvents which would require a separate and additional solvent recovery step.

Any unsaturated higher fatty acid generally having from 8 to 22 carbon atoms may be employed in the present process. Illustrative of the ethylenically unsaturated acids are the branched, or straight chain, poly- or mono-ethylenically unsaturated acids such as 3-octenoic acid, 10-undecenoic acid, linderic acid, lauroleic acid, myristoleic acid, tsuzuic acid, palmitoleic acid, petroselinic acid, oleic acid, elaidic acid, vaccenic acid, gadoleic acid, cetoleic acid, nervonic acid, linoleic acid, linolenic acid, eleostearic acid, hiragonic acid, moroctic acid, trimnodonic acid, eicosatetraenoic acid, nisinic acid, scoliodonic acid and chaulmoogric acid.

The acetylenically unsaturated fatty acids may also be employed. Such acids, however, occur only rarely in nature and are expensive to synthesize. Accordingly, such are not currently of commercial significance. Illustrative straight or branched chain, mono- or poly-unsaturated acids of this type are 10-undecenoic acid, tariric acid, stearolic acid, behenolic acid and isamic acid.

Because of their ready availability and relative ease of polymerization, oleic and linoleic acids are preferred starting materials for preparation of the polymeric fat acids. Of course, mixtures of fatty acids rich in unsaturated acids may be used. These mixtures of acids may be derived from any common raw material ordinarily used as sources for unsaturated material. Soybean oil, linseed oil, cottonseed oil, safflower oil and fish oils are typical examples of such sources. Tall oil fatty acids may also be employed. Saturated material normally occurs associated with the unsaturated material. The saturated acids do not polymerize in the process described. However, separation of the saturated and unsaturated acids before polymerization is not necessary to the practice of the present invention and the polymerization may be carried out in the presence of the unreacted saturated acid. After polymerization, the unreacted material may, if desired, be removed and the product worked up in any conventional manner.

As indicated, the polymerization is carried out in the presence of an acetic anhydride-lithium stabilized clay. The stabilization of the clay with acetic anhydride is accomplished by pretreating the clay with acetic anhydride. This is generally accomplished by refluxing the clay with the acetic anhydride, after which the product is filtered, washed and dried. The time of reflux does not appear critical but should be sufficient to allow the acetic anhydride to have its desirable effect on the clay. Generally in excess of one hour will be necessary and it is generally preferable to reflux for extended periods of 4 to 24 hours or more. Extremely extended periods, in excess of about 100 hours, do not appear to provide any advantage and, though not harmful, appear unnecessary. The acetic anhydride should be employed in an amount in excess of 0.25 parts acetic anhydride per part of clay by weight. However, an excess of acetic anhydride appears to be preferable although it is generally unnecessary to exceed a ratio of 5 to 1.

The stabilization with lithium is generally accomplished by the presence of a lithium compound which is merely added to the reaction vessel containing the pretreated acetic anhydride clay and the fatty acids to be polymerized. The clay may be "lithiated," however, before or after the acetic anhydride treatment by conventional methods of replacing or exchanging in part with lithium the exchangeable cations in the clay such as potassium, sodium, calcium, and magnesium which are normally present in the clays. Any method of exchange of the ions may be employed, provided the method of treatment does not interfere with the acetic anhydride treatment.

The clays which are suitable for this invention are the montmorillonite, bentonite clays. The naturally occurring, unmodified clays are preferred but improvement is also obtained employing acid activated clays such as Filtrol Grade I. Both acid and alkaline montmorillonite clays may thus be employed. The preferred clays, however, are the naturally occurring, unmodified montmorillonite clays having an alkaline pH of about 8, such as a natural clay mined from an area near Little Rock, Ark., consisting of montmorillonite and having a pH of about 8.3 and a moisture content of about 12% by weight.

The preferred lithium compounds which may be employed alone or in admixture are:

(1) salts of inorganic acids, such as the lithium halides, e.g. lithium chloride and lithium fluoride.
(2) lithium salts of organic carboxylic acids such as lithium acetate, propionate, caproate, and stearate.

Practically speaking, the lithium salts of aliphatic hydrocarbon monocarboxylic acids having up to 22 carbon atoms may be employed.

(3) lithium carbonate or hydroxide, which in the presence of the fatty acids is believed to form the fatty acid salt. Thus the fatty acid salts of lithium can apparently be formed in situ by the addition of lithium carbonate or lithium hydroxide.

The invention may perhaps best be illustrated by means of the examples below. In the examples employing tall oil fatty acids, commercially available tall oil fatty acids (Hercules, Pamak 1) were employed, having the following typical analysis:

| | |
|---|---|
| Acid value | 192–192.7 |
| Saponification value | 196–197.5 |
| Iodine value | 132.8–134 |
| Non-conjugated linoleic acid | 35.5% |
| Conjugated linoleic acid | 6.7–7.1% |
| Saturated acids | 1.7–3.5% |
| Rosin acids | 1.2–1.5% |
| Unsaponifiables | 1.6–2.1% |

EXAMPLE I

Into a flask equipped with a thermometer, stirrer and a straight reflux condenser with a drying tube (to protect against moisture) were placed 400 grams of a natural clay mined from an area near Little Rock, Ark., and consisting principally of montmorillonite having a pH of about 8.3 and about 11.4% moisture and 500 ml. of acetic anhydride. The mixture was refluxed with stirring for three days (the refluxing was done during the day and allowed to stand overnight). The product was filtered through a Buchner funnel and the residue washed several times with benzene. The residue was placed in a desiccator over NaOH pellets for several days. The moisture content (Karl Fischer) was 0.98%.

EXAMPLE II

Using the procedure of Example I, 400 grams of the same clay as in Example I were refluxed with 1000 ml. of benzene and 100 ml. of acetic anhydride. The moisture content of the product (Karl Fischer) was 3.05%. The product had a strong acetic anhydride odor.

EXAMPLE III

Into an apparatus, described in Example I, were placed 100 grams of the clay of Example I and 250 grams of acetic anhydride. The mixture was refluxed, with stirring for 24 hours. The mixture was allowed to cool to 70° C. and then rapidly filtered through a Buchner funnel using a suction pump. The residue (cake) was transferred to a 2000 ml. round bottom flask equipped with a stirrer, thermometer and indented distilling column. There was added 1000 ml. of toluene and the mixture was heated and stirred until 700–800 ml. of toluene were collected. The mixture was cooled to about 70° C. and then quickly filtered as described previously above. The product was washed twice with toluene and three times with benzene. It was then dried in a vacuum desiccator over paraffin. The moisture content of the product (Karl Fischer) was 0.10%.

The foregoing examples serve to illustrate different variations in the acetic anhydride treatment of the clay. These clays were then employed in polymerizations of the tall oil acids previously described as shown hereinbelow:

EXAMPLE IV

Polymerization procedure

Into a reaction flask equipped with a stirrer and a short air cooled reflux condenser (for atmospheric runs) or an autoclave (pressure runs) are placed the tall oil acids and a clay catalyst from one of the examples above plus the Li compound, where used. The mixture is heated, with stirring, under a vacuum and the system flushed twice with nitrogen. Upon reaching the desired temperature, the reaction mixture is maintained at this temperature for the length of time indicated. The reaction is then cooled to about 160° C. at which time phosphoric acid may be added to remove iron impurities. After cooling and extraction with a paraffinic hydrocarbon solvent, the product is heated on a steam cone and filtered through an activated clay. It is then washed with acid (HCL:$H_2O$; 2:1) followed by rinsing with distilled water to remove acid. The water is removed with $Na_2SO_4$, and the paraffinic hydrocarbon solvent removed by use of a flash evaporator under vacuum. The residue is distilled up to about 260° C. under vacuum. When lithium was employed, 1 meq. per gram of clay was employed, to 3 meq. of lithium per gram of clay are employed. As lower levels of lithium are employed, or operation is at atmospheric pressure, the levels contributed by the nitrate preferably are not more than 10–30% of the meq. of lithium employed per gram of clay.

With some lithium compounds such as the phosphate or sulfate, it may be necessary to conduct the polymerization at elevated conditions of pressure if the compounds are to be the sole lithium stabilizing compound. At atmospheric pressure operation, however, the sulfate or phosphate is preferably employed in admixture with other lithium compounds as discussed hereinabove with regard to the nitrate. When so employed it is preferable that the sulfate or phosphate contribute no more than about 75%

CONDITIONS

| Run | Percent Clay | Acetic Anhydride Treatment | Li Compound | Temp., °C. | Time, Hrs. | Pressure |
|---|---|---|---|---|---|---|
| 1 | 15 | Ex. III | Carbonate | 215 | 4 | Atmospheric. |
| 2 | 25 | Ex. I | Acetate | 200 | 4 | Do. |
| 3 | 25 | Ex. I | do | 230 | 5 | 36–56. |
| 4 | 25 | Ex. II | do | 230 | 5 | 50–66. |
| 5 | 25 | Ex. II | do | 200 | 4 | Atmospheric. |
| 6 | 25 | Ex. II | Carbonate | 200 | 4 | Do. |
| 7 | 25 | Ex. I | do | 230 | 5 | 70–82. |
| 8 | 25 | Ex. II | do | 230 | 5 | 60–68. |
| 9 | 25 | Ex. I | do | 200 | 4 | Atmospheric. |
| A | 15 | None | None | 215 | 4 | Do. |
| B | 15 | do | Acetate | 215 | 4 | Do. |
| C | 25 | do | Carbonate | 200 | 4 | Do. |
| D | 25 | do | do | 230 | 5 | 100–124. |
| E | 25 | do | Acetate | 230 | 5 | 50–74. |
| F | 15 | Ex. III | None | 215 | 4 | Atmospheric. |
| G | 25 | Ex. II | do | 200 | 4 | Do. |

RESULTS

| Run | Yield of Residue, Percent | Saponification Value | Acid Value | Percent M | Percent D | Percent T |
|---|---|---|---|---|---|---|
| 1 | 63.0 | 195 | 184 | 5.4 | 75.9 | 18.7 |
| 2 | 69.5 | 198 | 183 | 5.8 | 75.4 | 18.8 |
| 3 | 70.2 | 199 | 187 | 6.0 | 81.8 | 12.2 |
| 4 | 71.9 | 199 | 185 | 5.2 | 77.4 | 17.4 |
| 5 | 70.8 | 196 | 186 | 6.0 | 74.2 | 19.8 |
| 6 | 67.4 | 196 | 184 | 4.3 | 77.0 | 18.7 |
| 7 | 73.5 | 199 | 187 | 6.8 | 77.9 | 15.3 |
| 8 | 72.7 | 199 | 190 | 5.5 | 76.6 | 17.9 |
| 9 | 66.8 | 192 | 180 | 6.7 | 75.0 | 18.3 |
| A | 47.0 | 187 | 172 | 4.6 | 68.6 | 26.8 |
| B | 68.77 | 196 | 186 | 5.3 | 77.3 | 17.4 |
| C | 63.8 | 191 | 181 | 5.2 | 74.5 | 20.3 |
| D | 62.5 | 194 | 178 | 6.6 | 73.6 | 19.5 |
| E | 68.5 | 200 | 187 | 5.4 | 78.0 | 16.6 |
| F | 46.4 | 192 | 173 | 5.6 | 67.9 | 26.5 |
| G | 52.6 | 182 | 168 | 9.5 | 64.4 | 31.1 |

In the foregoing, the runs designated by letter were included for comparison. It is apparent from a comparison of the data that the use of the acetic anhydride-lithium stabilized clay provides distinct improvement.

While the use of 1.0 milliequivalents (meq.) of lithium per gram of clay was employed to illustrate specifically the invention, the use of as low as 0.3 meq. may be employed, particularly with the preferred lithium compounds. Generally, it is not necessary to exceed 6 meq. of lithium per gram of clay to obtain the results desired, although greater amounts may be employed, if desirable or, if necessary, due to some peculiarity of the particular clay employed. In general, from 0.75 to 3.0 meq. of lithium per gram of clay is preferred.

In general, any lithium compound, organic or inorganic, other than solely lithium nitrate may be employed; but the nitrate may be employed if used in admixture with other more suitable compounds, such as those previously indicated as preferred, provided the amount or level of nitrate is kept below an interfering amount. By "interfering amount" is intended that level or amount which cannot readily or preferably be tolerated without lowering the yield to below that obtained without the use of lithium. When employed in admixture with other lithium compounds, it is preferable that the lithium nitrate contribute no more than 50% of the milliequivalents of lithium employed when the preferred lithium levels of 0.75 of the milliequivalents of lithium per gram of clay when the preferred levels of 0.75–3 meq. of lithium per gram of clay are employed. Again as lower total levels of lithium are employed, the level contributed by the sulfate or phosphate is preferably lower, i.e. not more than about 50%.

It is to be understood that the invention is not to be limited to the exact details of the operation or exact compounds shown and described, as obvious modifications and equivalents will be apparent to one skilled in the art and the invention is to be limited only by the scope of the appended claims.

The embodiments of the invention in which an exclusive property or privilege is claimed are defined as follows:

1. A clay catalyst for polymerizing unsaturated higher fatty acids comprising a clay stabilized with acetic anhydride in an amount in excess of 0.25 parts of acetic anhydride per part of clay by weight and a lithium salt compound or lithium nitrate and another lithium salt compound in amounts to supply at least 0.3 meq. of lithium per gram of clay such that when lithium nitrate is present no more than 50% of the total meq. of lithium present is supplied by the lithium nitrate.

2. A clay catalyst as defined in claim 1 in which said lithium compound is lithium carbonate.

3. A clay catalyst as defined in claim 1 in which said lithium compound is lithium acetate.

4. A clay catalyst as defined in claim 1 in which said lithium compound is lithium hydroxide.

5. A clay catalyst as defined in claim 1 in which said lithium compound is a lithium halide.

6. A clay catalyst as defined in claim 1 in which said lithium compound is a lithium salt of a higher fatty acid.

References Cited

UNITED STATES PATENTS 2,347,562   4/1944   Johnston   260—407
2,891,904   6/1959   Kennedy   252—476

FOREIGN PATENTS 280,712   10/1927   Great Britain.

PATRICK P. GARVIN, *Primary Examiner.*